(12) United States Patent
Kim

(10) Patent No.: US 11,359,667 B2
(45) Date of Patent: Jun. 14, 2022

(54) BEARING AND POWER GENERATION SYSTEM HAVING SAME

(71) Applicant: DOOSAN HEAVY INDUSTRIES & CONSTRUCTION CO., LTD., Changwon-si (KR)

(72) Inventor: Yeong Chun Kim, Changwon (KR)

( * ) Notice: Subject to any disclaimer, the term of this patent is extended or adjusted under 35 U.S.C. 154(b) by 0 days.

(21) Appl. No.: 17/133,727

(22) Filed: Dec. 24, 2020

(65) Prior Publication Data

US 2021/0246938 A1 Aug. 12, 2021

(30) Foreign Application Priority Data

Feb. 7, 2020 (KR) .......................... 10-2020-0014899

(51) Int. Cl.
| | |
|---|---|
| *F16C 17/03* | (2006.01) |
| *F16C 33/10* | (2006.01) |
| *F16C 37/00* | (2006.01) |
| *F16C 17/06* | (2006.01) |

(52) U.S. Cl.
CPC .............. *F16C 17/03* (2013.01); *F16C 17/06* (2013.01); *F16C 33/1045* (2013.01); *F16C 37/002* (2013.01)

(58) Field of Classification Search
CPC ......... F16C 17/03; F16C 17/06; F16C 37/002
See application file for complete search history.

(56) References Cited

U.S. PATENT DOCUMENTS

| | | | | |
|---|---|---|---|---|
| 1,117,502 | A * | 11/1914 | Kingsbury | .............. F16C 17/06 384/307 |
| 3,131,005 | A * | 4/1964 | Wagley | ................... F16C 17/06 384/306 |
| 5,007,745 | A | 4/1991 | Ball | |
| 6,588,933 | B2 * | 7/2003 | Ferguson | ................ F16C 17/04 384/122 |
| 8,834,032 | B2 * | 9/2014 | Suzuki | ................ F16C 33/1085 384/311 |
| 9,874,247 | B2 * | 1/2018 | Wang | ...................... F16C 17/03 |
| 2015/0159692 | A1 * | 6/2015 | Dourlens | ................ F16C 17/03 384/192 |

FOREIGN PATENT DOCUMENTS

| | | |
|---|---|---|
| JP | 2006198656 A | 8/2006 |
| JP | 2016109269 A | 6/2016 |
| JP | 2016-138603 A | 8/2016 |

OTHER PUBLICATIONS

KR OA dated Oct. 27, 2021.
KR Office Action dated Mar. 10, 2022.

* cited by examiner

*Primary Examiner* — James Pilkington
(74) *Attorney, Agent, or Firm* — Harvest IP Law, LLP

(57) ABSTRACT

Provided are a bearing and a power generation system including the same. The bearing supporting a shaft system of a power generation system in a radial direction includes a pad disposed on an outer side of the shaft system with respect to the radial direction and including a cooling path through which oil flows. In the bearing and the power generation system including the same, the cooling flow path is formed through the pad so that the oil existing between the pad and the shaft system flows into the cooling flow path to cool the pad. Accordingly, the pad is continuously cooled during the operation of the power generation system, and the temperature of the pad is prevented from rising above the threshold value even if friction occurs between the shaft system and the pad.

15 Claims, 16 Drawing Sheets

BEARING AND POWER GENERATION SYSTEM HAVING SAME

CROSS-REFERENCE TO RELATED APPLICATION

This application claims priority to Korean Patent Application No. 10-2020-0014899, filed on Feb. 7, 2020, the entire disclosure of which is incorporated herein by reference in its entirety.

BACKGROUND

1. Field

Apparatuses and methods consistent with exemplary embodiments relate to a bearing and a power generation system including the same and more particularly, to a bearing supporting a shaft system of a power generation system and a power generation system including the same.

2. Description of the Related Art

A power generation system is a facility for generating electricity. The power generation system includes a generator that generates electricity based on an electromagnetic induction principle and a power generation unit that generates a driving force for driving the generator. Here, the power generation unit may include a gas turbine and a steam turbine. The gas turbine generates rotational force by compressing air introduced from the outside, combusting a mixture of the compressed air and fuel, and passing the generated combustion gas therethrough. The steam turbine generates rotational force by passing steam therethrough.

The generator and the power generation unit are connected by a shaft system. That is, the generator and the power generation unit are equipped with respective shafts in a center. As the shaft of the generator is connected to the shaft of the power generation unit, the rotational driving force generated by the power generation unit is transmitted to the shaft of the generator via the shaft of the power generation unit.

In order to rotatably support the shaft system, a bearing is provided in the power generation system. Bearings are divided into thrust journal bearings and radial journal bearings. The thrust journal bearing is provided on a thrust collar provided on an outer peripheral surface of the shaft system and supports the shaft system in an axial direction. The radial journal bearing contacts a journal portion of the shaft system and supports the shaft system in a radial direction. The thrust journal bearing and the radial journal bearing are provided with pads that contact the thrust collar or the journal portion of the shaft system, respectively, and support the shaft system in the axial direction or the radial direction, respectively.

Because the mechanical properties deteriorate at high temperature, the pad needs to be maintained at a maximum temperature of about 105 degrees Celsius or less. However, in the related art bearing, as the shaft system rotates, friction continues to occur between the pad and the thrust collar or the pad and the journal, and there is a problem that the temperature of the pad rises above a threshold value.

SUMMARY

Aspects of one or more exemplary embodiments provide a bearing having a structure capable of cooling a pad during operation of a power generation system, and a power generation system including the same.

Additional aspects will be set forth in part in the description which follows and, in part, will become apparent from the description, or may be learned by practice of the exemplary embodiments.

According to an aspect of an exemplary embodiment, there is provided a bearing supporting a shaft system of a power generation system in a radial direction, the bearing including a pad disposed on an outer side of the shaft system with respect to the radial direction and including a cooling path through which oil flows.

The pad may be formed in a plate shape curved to surround an outer circumferential surface of the shaft system.

The bearing may further include a pivot coupled to the outer side of the pad in the radial direction.

The cooling path may be formed on one side of the pivot when viewed along the radial direction of the shaft system.

The cooling path may be formed to extend along an axial direction of the shaft system.

The cooling path may be arranged parallel to the axial direction of the shaft system.

The pad may include an auxiliary flow path intersecting the cooling path and through which oil flows.

The auxiliary flow path may include a plurality of flow path sections spaced apart from each other along the axial direction of the shaft system.

The auxiliary flow path may be formed to extend along a circumferential direction of the pad such that one end thereof faces the pivot and the other end thereof faces the circumferential end of the pad.

The cooling path may be disposed to be inclined with respect to the axial direction of the shaft system.

According to an aspect of another exemplary embodiment, there is provided a bearing supporting a shaft system of a power generation system in an axial direction, the bearing including a pad disposed on a thrust collar on an outer circumferential surface of the shaft system and including a cooling path through which oil flows.

The pad may be formed in a plate shape with an arc pattern in which a circumferential width gradually increases in an outward direction with respect to a radial direction of the shaft system.

The bearing may further include a pivot coupled to a side of the pad opposite to the thrust collar.

The cooling path may be formed on one side of the pivot when viewed along the radial direction of the shaft system.

The cooling path may be formed to extend along the radial direction of the shaft system.

The cooling path may include a plurality of cooling path sections arranged such that an interval therebetween increases in an outward direction with respect to the radial direction.

The pad may include an auxiliary flow path intersecting the cooling path sections and through which oil flows.

The auxiliary flow path may include a plurality of flow path sections spaced apart from each other along the radial direction of the shaft system.

The auxiliary flow path may be formed to extend along a circumferential direction of the pad such that one end thereof faces the pivot and the other end thereof faces the circumferential end of the pad.

The cooling path may include a plurality of cooling path sections disposed such that an interval therebetween is constant in an outward direction with respect to the radial direction and the cooling path sections may be inclined with respect to the circumferential direction of the shaft system.

In the bearing and the power generation system including the same according to one or more exemplary embodiments, the cooling flow path is formed through the pad, so that the oil existing between the pad and the shaft system flows into the cooling flow path to cool the pad. Therefore, the pad can be continuously cooled during the operation of the power generation system, and the temperature of the pad can be prevented from rising above the threshold value even if friction occurs between the shaft system and the pad.

BRIEF DESCRIPTION OF THE DRAWINGS

The above and other aspects will become more apparent from the following description of the exemplary embodiments with reference to the accompanying drawings, in which.

DETAILED DESCRIPTION OF THE DISCLOSURE

Figure 1:
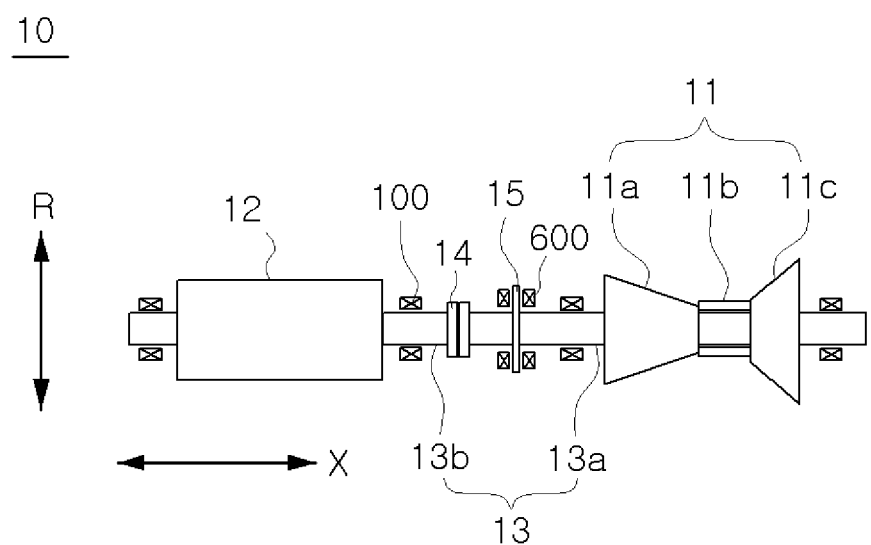
FIG. 1 is a view illustrating a power generation facility including a gas turbine as a power generation unit according to an exemplary embodiment.

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
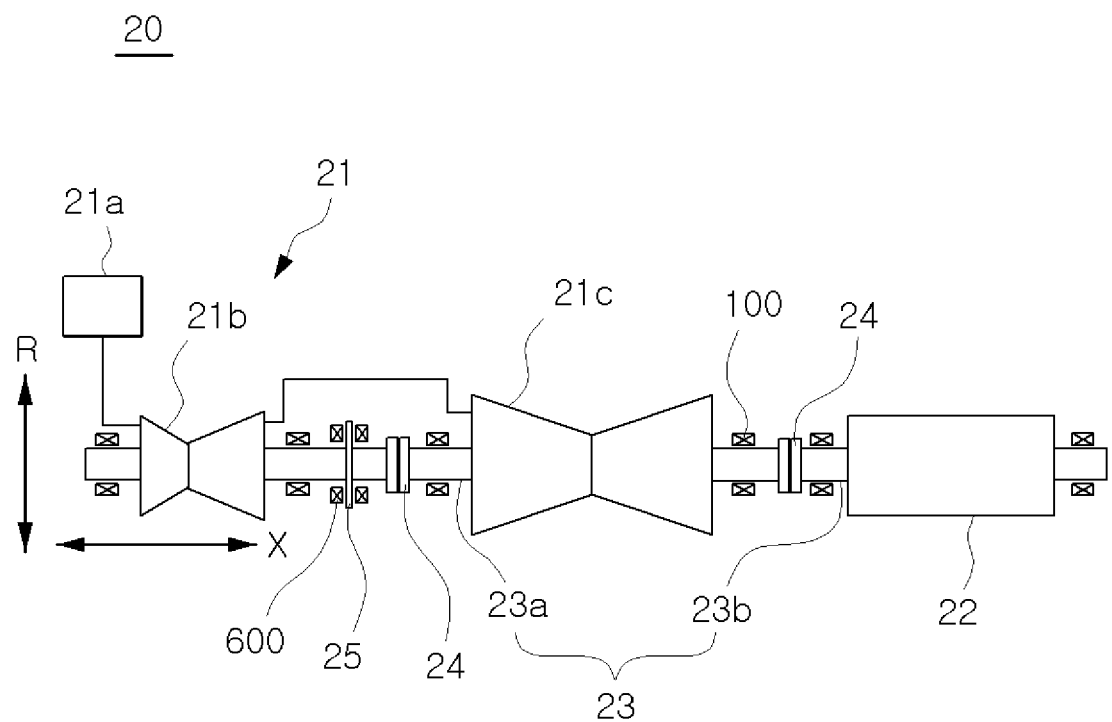
FIG. 2 is a view illustrating a power generation facility including a steam turbine as a power generation unit according to an exemplary embodiment.

FIG. 1 is a view illustrating a power generation facility including a gas turbine as a power generation unit according to an exemplary embodiment, and FIG. 2 is a view illustrating a power generation facility including a steam turbine as a power generation unit according to an exemplary embodiment.

Referring to FIG. 1, a power generation system 10 according to an exemplary embodiment includes a gas turbine 11, a generator 12, a shaft system 13, a coupling 14, a thrust collar 15, a radial journal bearing 100, and a thrust journal bearing 600.

The gas turbine 11 includes a compressor 11a, a combustor 11b, and a turbine 11c to generate power for driving the generator 12 by combustion gas. The compressor 11a compresses air introduced from the outside and supplies the compressed air to the combustor 11b. The combustor 11b mixes the compressed air supplied from the compressor 11a with fuel and combusts the mixture. The combustion gas supplied from the combustor 11b passes through the turbine 11c to generate power for driving the generator 12.

The generator 12 is installed on one side of the gas turbine 11 and is driven by the gas turbine 11. The generator 12 generates power according to the principle of electromagnetic induction.

The shaft system 13 includes a gas turbine shaft 13a and a generator shaft 13b to transmit the power generated from the gas turbine 11 to the generator 12. The gas turbine shaft 13a is provided to pass through the center of the gas turbine 11 and rotates by combustion gas flowing through an inside of the turbine 11c. The generator shaft 13b is provided to pass through the generator 12 such that the generator shaft is connected to the gas turbine shaft 13a. In addition, the generator shaft 13b rotates by receiving the rotational driving force of the gas turbine shaft 13a to generate electric power through the generator 12.

The coupling 14 is installed between the gas turbine shaft 13a and the generator shaft 13b, and connects the gas turbine shaft 13a and the generator shaft 13b to each other. Accordingly, the coupling 14 allows power to be transmitted from the gas turbine shaft 13a to the generator shaft 13b.

The thrust collar 15 is installed on an outer circumferential surface of the shaft system 13 so that the shaft system 13 is supported in an axial direction by the thrust journal bearing 600. Although FIG. 1 illustrates that the thrust collar 15 is installed on the gas turbine shaft 13a, it is understood that this is merely an example, and the thrust collar 15 may be installed on the generator shaft 13b.

The radial journal bearing 100 is installed on an outer circumferential surface of the shaft system 13 to support the shaft system 13 in a radial direction. As illustrated in FIG. 1, a plurality of shaft systems 13 may be provided for each of the gas turbine shaft 13a and the generator shaft 13b.

The thrust journal bearing 600 is installed on the thrust collar 15 to support the shaft system 13 in an axial direction.

For example, the thrust journal bearings 600 may be provided on a front and rear sides of the thrust collar 15 in the axial direction, respectively.

Referring to FIG. 2, the power generation system 20 according to an exemplary embodiment includes a steam turbine 21, a generator 22, a shaft system 23, a coupling 24, a thrust collar 25, a radial journal bearing 100, and a thrust journal bearing 600.

The steam turbine 21 includes a boiler 21a, and a turbine 21b and 21c to generate power for driving the generator 22 using steam flowing through the steam turbine. The boiler 21a generates steam by evaporating water supplied thereto. The turbine 21b and 21c generates power for driving the generator 22 by passing steam supplied from the boiler 21a. The turbine 21b and 21c includes a high-pressure turbine 21b and a low-pressure turbine 21c. The high-pressure turbine 21b is installed in front of the low-pressure turbine 21c, and the steam generated in the boiler 21a passes. In the low-pressure turbine 21c, the steam flowing through the high-pressure turbine 21b passes.

The generator 22 is installed on one side of the steam turbine 21 and is driven by the steam turbine 21. The generator 22 generates power according to the principle of electromagnetic induction.

The shaft system 23 includes a steam turbine shaft 23a and a generator shaft 23b to transmit the power generated from the steam turbine 21 to the generator 22. The steam turbine shaft 23a is provided to pass through the center of the turbine 21b and 21c of the steam turbine 21 and rotates by steam flowing through an inside of the turbine 21b and 21c. The generator shaft 23b is provided to pass through the generator 22 such that the generator shaft is connected to the steam turbine shaft 23a. In addition, the generator shaft 23b rotates by receiving the rotational driving force of the steam turbine shaft 23a to generate electric power through the generator 22.

The coupling 24 is installed between the steam turbine shaft 23a and the generator shaft 23b, and connects the steam turbine shaft 23a and the generator shaft 23b to each other. Accordingly, the coupling 24 allows power to be transmitted from the steam turbine shaft 23a to the generator shaft 23b. Here, the steam turbine shaft 23a may include a high-pressure turbine shaft installed to pass through the high-pressure turbine 21b and a low-pressure turbine shaft installed to pass through the low-pressure turbine 21c. In addition, the coupling 24 may be installed between the high-pressure turbine shaft and the low-pressure turbine shaft.

The thrust collar 25 is installed on an outer circumferential surface of the shaft system 23 so that the shaft system 23 is supported in an axial direction by the thrust journal bearing 600. Although FIG. 2 illustrates that the thrust collar 25 is installed on the steam turbine shaft 23a, it is understood that this is merely an example, and the thrust collar 25 may be installed on the generator shaft 23b.

The radial journal bearing 100 is installed on an outer circumferential surface of the shaft system 23 to support the shaft system 23 in a radial direction. As illustrated in FIG. 2, a plurality of shaft systems 23 may be provided for each of the steam turbine shaft 23a and the generator shaft 23b.

The thrust journal bearing 600 is installed on the thrust collar 25 to support the shaft system 23 in an axial direction. For example, the thrust journal bearings 600 may be provided on a front and rear sides of the thrust collar 25 in the axial direction, respectively.

Figure 3:
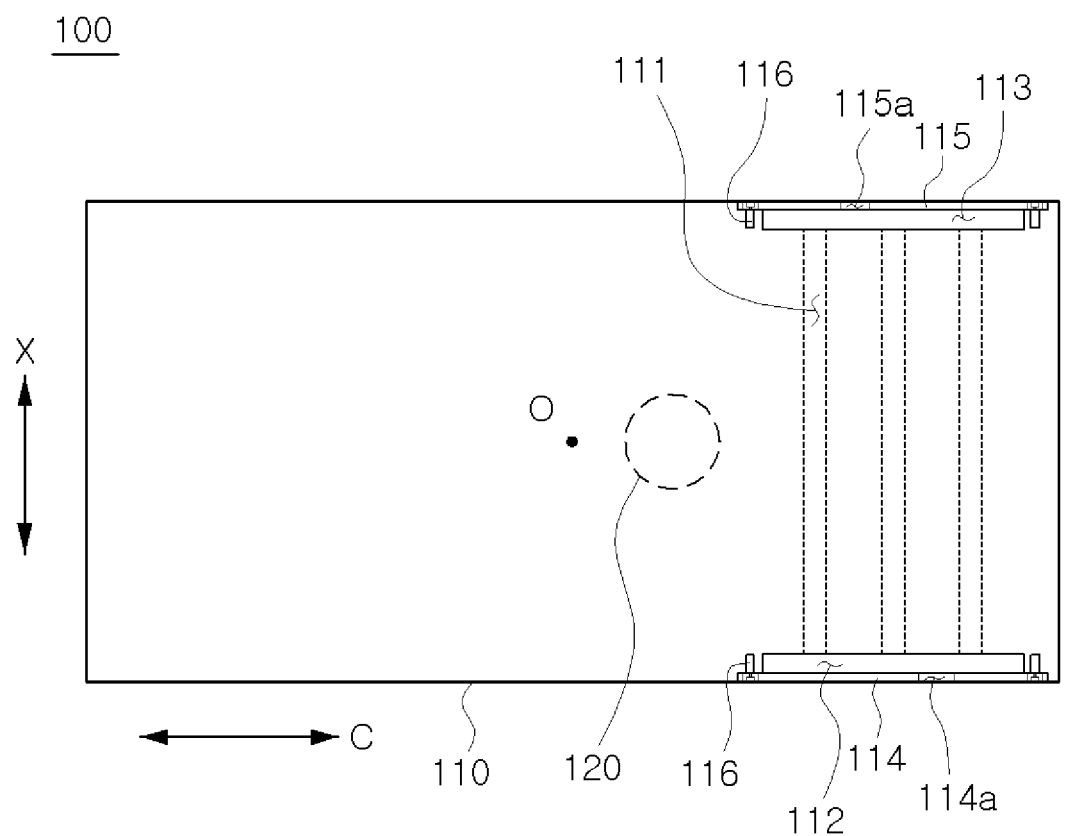
FIG. 3 is a plan view illustrating a first example of a radial journal bearing according to the exemplary embodiment.
Figure 4:
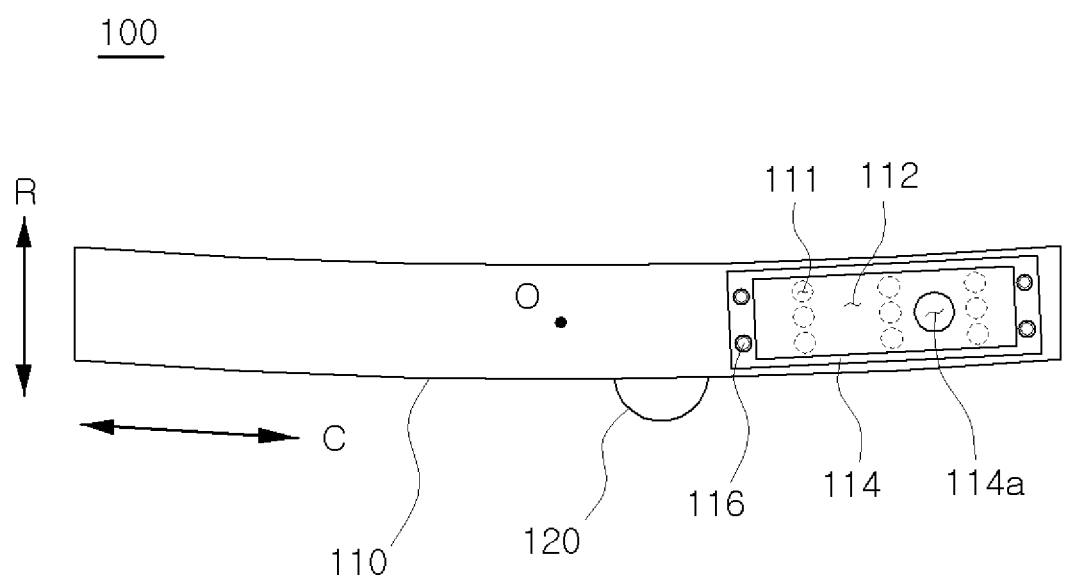
FIG. 4 is a front view of FIG. 3.
Figure 5:
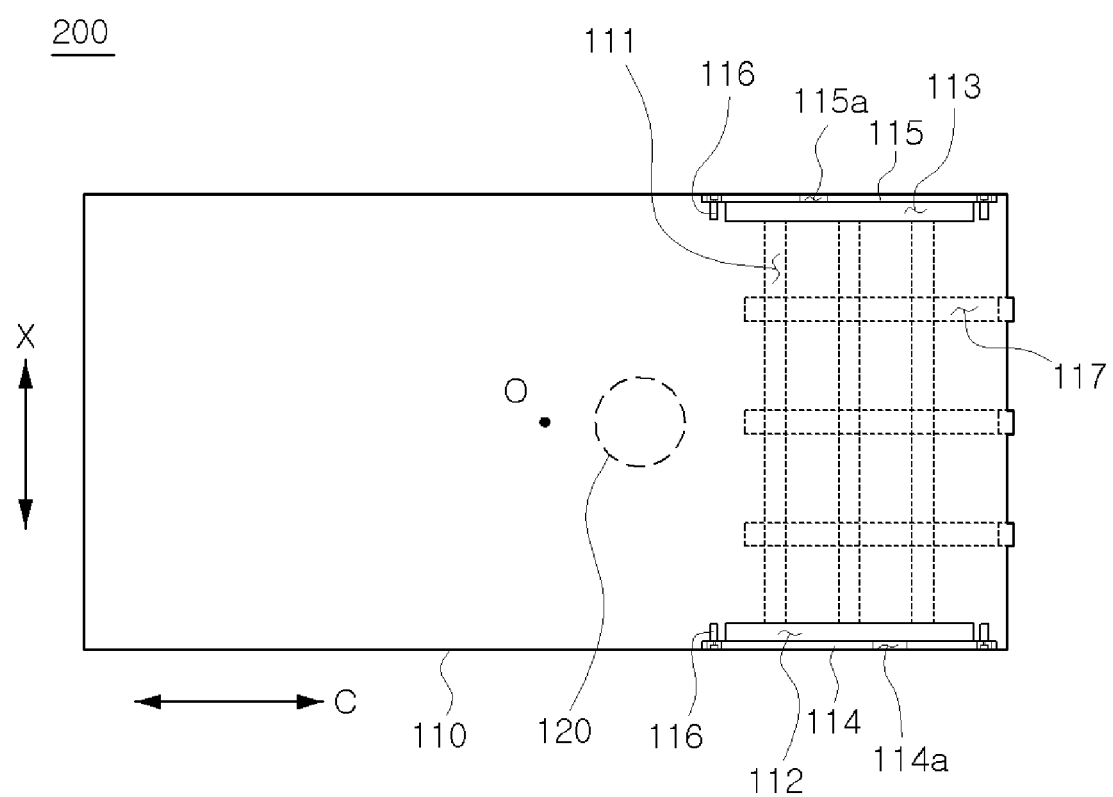
FIG. 5 is a plan view illustrating a second example of a radial journal bearing according to the exemplary embodiment.
Figure 6:
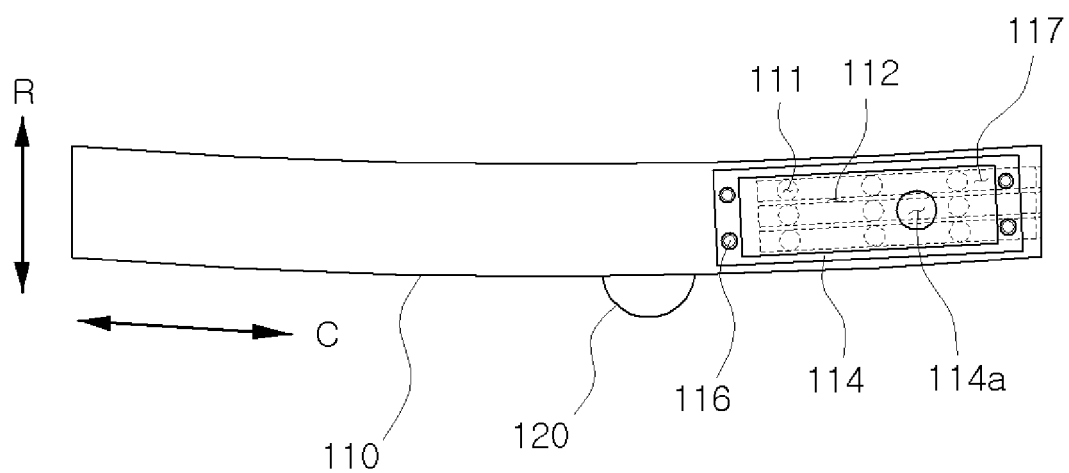
FIG. 6 is a front view of FIG. 5.
Figure 7:
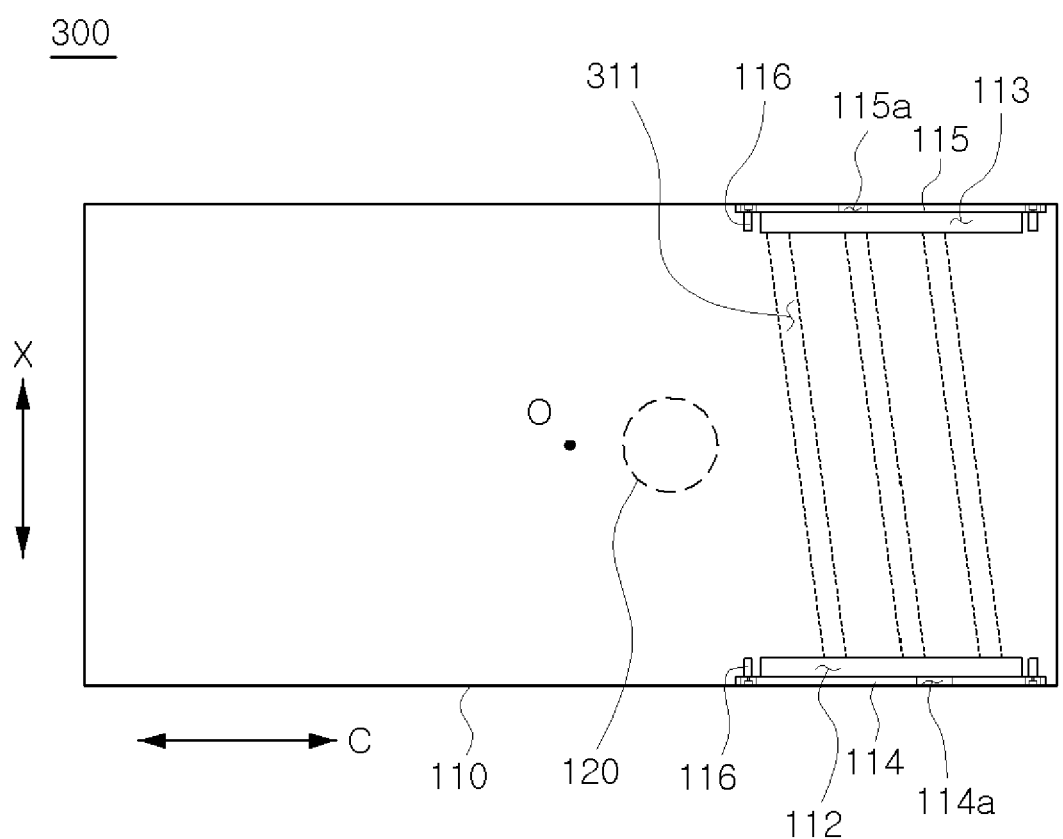
FIG. 7 is a plan view illustrating a third example of a radial journal bearing according to the exemplary embodiment.
Figure 8:
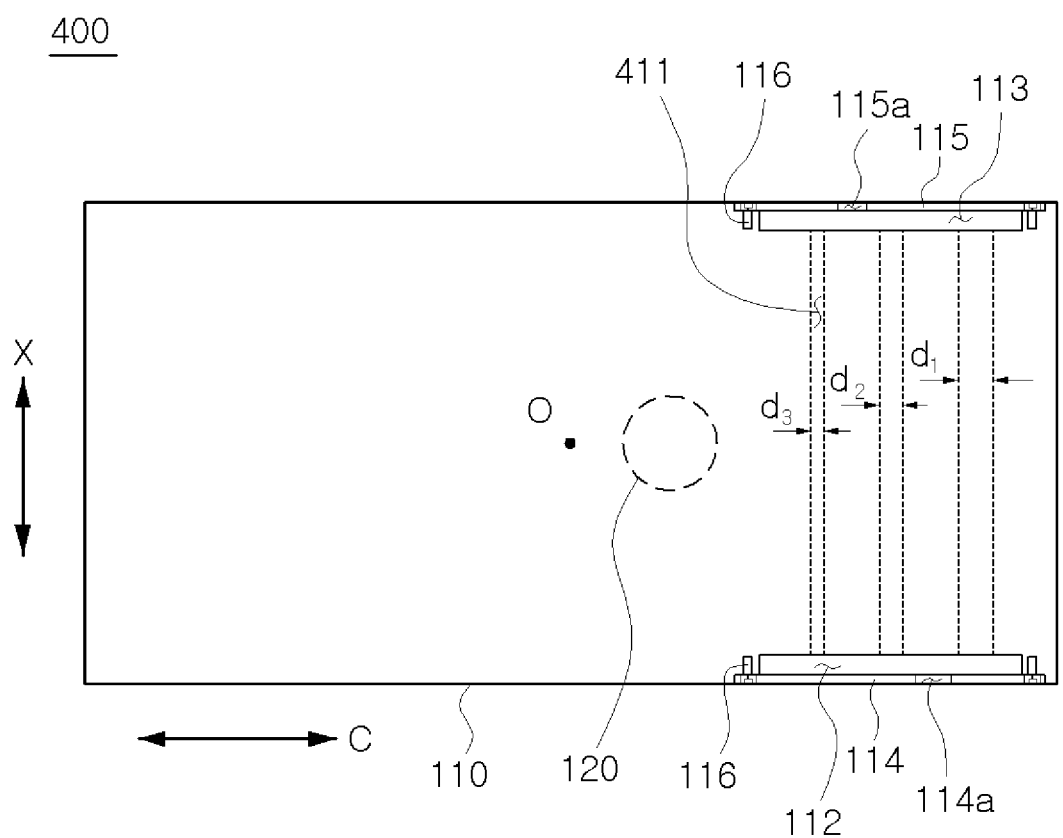
FIG. 8 is a plan view illustrating a fourth example of a radial journal bearing according to the exemplary embodiment.
Figure 9:
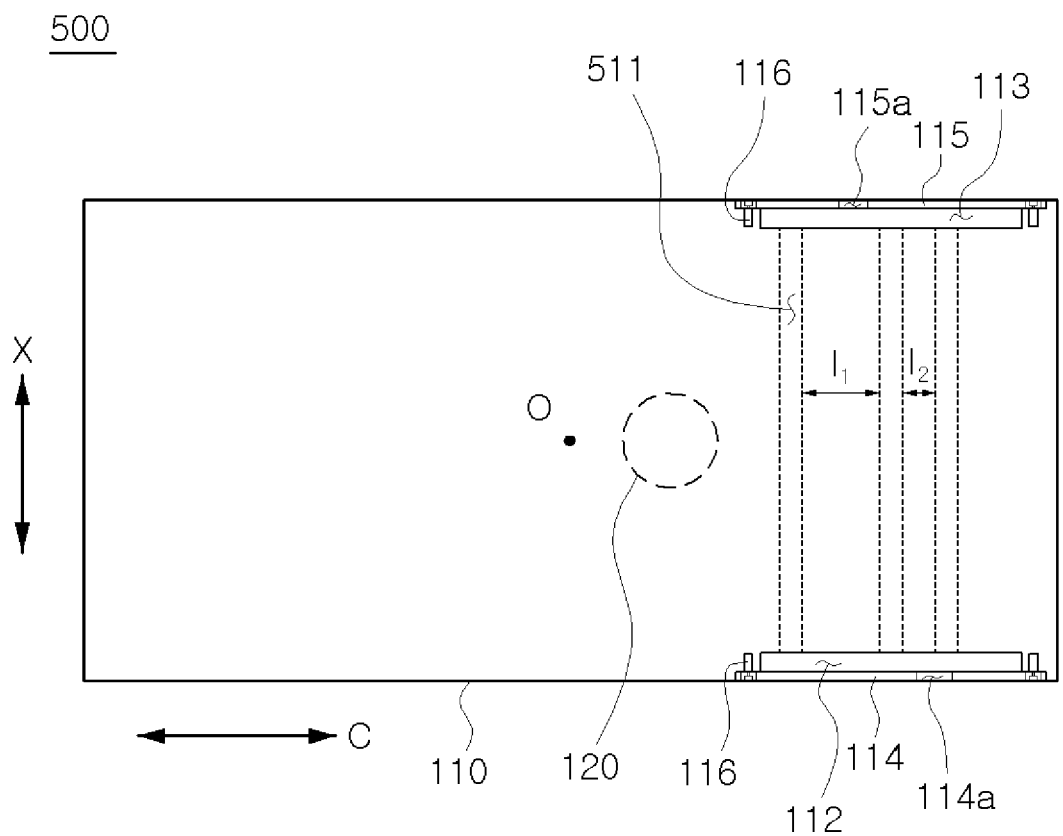
FIG. 9 is a plan view illustrating a fifth example of a radial journal bearing according to the exemplary embodiment.

FIG. 3 is a plan view illustrating a first example of a radial journal bearing according to the exemplary embodiment, FIG. 4 is a front view of FIG. 3, FIG. 5 is a plan view illustrating a second example of a radial journal bearing according to the exemplary embodiment, FIG. 6 is a front view of FIG. 5, FIG. 7 is a plan view illustrating a third example of a radial journal bearing according to the exemplary embodiment, FIG. 8 is a plan view illustrating a fourth example of a radial journal bearing according to the exemplary embodiment, and FIG. 9 is a plan view illustrating a fifth example of a radial journal bearing according to the exemplary embodiment.

Referring to FIGS. 3 and 4, the radial journal bearing 100 according to the first embodiment includes a pad 110 and a pivot 120 for supporting the shaft systems 13 and 23 in the radial direction R.

The pad 110 is installed on an outer side of the shaft system 13 and 23 in the radial direction R. In addition, the pad 110 may be formed in a plate shape, and may be formed in a curved shape to surround the outer circumferential surface of the shaft system 13 and 23 as illustrated in FIG. 4.

The pivot 120 is coupled to the outside of the pad 110 in the radial direction R, and is mounted on an external structure to support the pad 110. When viewing the pad 110 in the radial direction R of the shaft system 13 and 23, assuming that the density of the pad 110 is constant for each part, the pivot 120 may be coupled to the pad 110 at a position eccentric from the center of gravity O of the pad 110 along the circumferential direction C of the shaft system 13 and 23.

The pad 110 includes an internal cooling path 111, an inlet chamber 112, and an outlet chamber 113.

When viewing the pad 110 along the radial direction R of the shaft system 13 and 23, the cooling path 111 is spaced apart from the pivot 120 in the circumferential direction C of the shaft system 13 and 23. The cooling path 111 is composed of a plurality of cooling path sections spaced apart from each other along the circumferential direction C of the shaft system 13 and 23, and the cooling path sections extend along the axial direction X of the shaft system 13 and 23.

To rotatably support the shaft system 13 and 23 while preventing friction between the shaft system 13 and 23 and the pad 110, oil is supplied between the pad 110 and the shaft system 13 and 23. Oil provided between the pad 110 and the shaft system 13 and 23 flows into the cooling path 111. Because the pad 110 is cooled by the oil flowing into the cooling path 111, even when friction occurs between the shaft system 13 and 23 and the pad 110, it is possible to prevent the temperature of the pad 110 from rising above the threshold value.

The inlet chamber 112 communicates with an inlet of the cooling path 111, and oil provided between the pad 110 and the shaft systems 13 and 23 flows into the inlet chamber 112. The outlet chamber 113 communicates with an outlet of the cooling path 111, and oil flowing through the cooling path 111 is discharged between the pad 110 and the shaft system 13 and 23. The inlet chamber 112 and the outlet chamber 113 are disposed spaced apart from each other along the axial direction X of the shaft system 13 and 23, and may be formed at ends of the pad 110, respectively.

The radial journal bearing 100 may further include an inlet cover 114, an outlet cover 115, and a fastening member 116.

The inlet cover 114 covers the inlet chamber 112, and the outlet cover 115 covers the outlet chamber 113. In this case, the inlet cover 114 has an inlet hole 114a through which oil provided between the shaft system 13 and 23 and the pad 110 is introduced. The outlet cover 115 has an outlet hole 115a through which the oil flowing through the cooling path 111 is discharged between the shaft system 13 and 23 and the pad 110. Here, separate circulation means may be coupled to the inlet hole 114a and the outlet hole 115a. Therefore, the oil provided between the shaft system 13 and 23 and the pad 110 flows by means of the circulation means into the inlet chamber 112 and through the cooling path 111 and then is supplied between the pad 110 and the shaft system 13 and 23 from the outlet chamber 113 through the circulation means.

The inlet hole 114a or the outlet hole 115a may be formed between the plurality of cooling path sections 111, respectively. For example, the inlet hole 114a or the outlet hole 115a may be disposed in a position offset from one side from the cooling path 111, when viewed along the axial direction X of the shaft system 13 and 23, as shown in FIG. 4. Therefore, the oil flowing into the inlet chamber 112 through the inlet hole 114a may be prevented from flowing into any one of the plurality of cooling path sections 111, and the oil flowing into the outlet chamber 113 through the cooling path 111 may be uniformly discharged through the outlet hole 115a.

On the other hand, the plurality of cooling path sections 111 are arranged parallel to each other in the axial direction X of the shaft system 13 and 23. Therefore, oil flowing into the cooling path 111 through the inlet chamber 112 flows along the axial direction X of the shaft system 13 and 23, and is then discharged to the outside through the outlet chamber 113.

Referring to FIGS. 5 and 6, in the radial journal bearing 200 according to the second embodiment, the pad 110 further includes an auxiliary flow path 117. The auxiliary flow path 117 is composed of a plurality flow path sections disposed spaced apart from each other along the axial direction X of the shaft system 13 and 23. In addition, the auxiliary flow path sections 117 are formed to intersect with the plurality of cooling path sections 111, respectively. At this time, each auxiliary flow path sections 117 is formed to extend along the circumferential direction C of the shaft system 13 and 23 so that one end thereof faces the pivot 120 and the other end thereof faces the end of the pad 110 based on the circumferential direction C of the shaft system 13 and 23. Therefore, oil flowing through the cooling path sections 111 is supplied to and flows through the auxiliary path sections 117, thereby cooling the pad 110 in a wider range.

Referring to FIG. 7, in the radial journal bearing 300 according to the third embodiment, a plurality of cooling path sections 311 are arranged to be inclined with respect to the axial direction X of the shaft system 13 and 23. Although FIG. 7 illustrates that the cooling path sections 311 are inclined toward the pivot 120 in a direction toward one side (e.g., upward in FIG. 7) in the axial direction X of the shaft system 13 and 23, it is understood that this is merely an example, and the cooling path sections 311 may be formed to be inclined in a direction away from the pivot 120 when approaching one side in the axial direction X of the shaft system 13 and 23.

Referring to FIG. 8, in the radial journal bearing 400 according to the fourth embodiment, a plurality of cooling path sections 411 may have different diameters. That is, the cooling path sections 411 may be formed to have different diameters (e.g., d1>d2>d3), respectively.

For example, the plurality of cooling path sections 411 may be formed in a shape whose diameter increases gradually as the distance from the pivot 120 along the circumferential direction C of the shaft system 13 and 23 increases. The temperature of the pad 110 gradually increases from the center toward the end in the circumferential direction C of the shaft system 13 and 23. Therefore, when the diameters of the cooling path sections 411 increase in a direction away from the pivot 120 along the circumferential direction C of the shaft system 13 and 23, the amount of oil flowing in the circumferential direction C from the end of the pad 120 increases than from the central portion of the pad 120, so that the pad 120 can be effectively cooled according to the temperature distribution of the pad 120.

Referring to FIG. 9, in the radial journal bearing 500 according to the fifth embodiment, a plurality of cooling path sections 511 may be formed at different intervals between adjacent cooling path sections 511. That is, the cooling path sections 511 may be formed to have different intervals (e.g., $I_1 > I_2$).

For example, the plurality of cooling path sections 511 may be arranged such that the interval therebetween gradually decreases as the distance from the pivot 120 increases along the circumferential direction C of the shaft system 13 and 23. The temperature of the pad 110 gradually increases in a direction from the center toward the end in the circumferential direction C of the shaft system 13 and 23. Accordingly, when the interval between the cooling path sections 511 decreases as the distance from the pivot 120 increases along the circumferential direction C of the shaft system 13 and 23, the amount of oil flowing in the circumferential direction C from the end of the pad 120 increases than from the central portion of the pad 120, so that the pad 120 can be effectively cooled according to the temperature distribution of the pad 120.

According to the radial journal bearing 100, 200, 300, 400, 500 according to the exemplary embodiments and the power generation system 10 and 20 including the same, the pad 110 can be cooled by circulating oil provided between the pad 110 and the shaft system 13 and 23 through the cooling path sections 111, 311, 411, 511, thereby allowing the pad 110 to be continuously cooled during the operation of the power generation system 10 and 20 and preventing the temperature of the pad 110 from rising above the threshold value even if friction occurs between the shaft system 13 and 23 and the pad 110.

Figure 10:
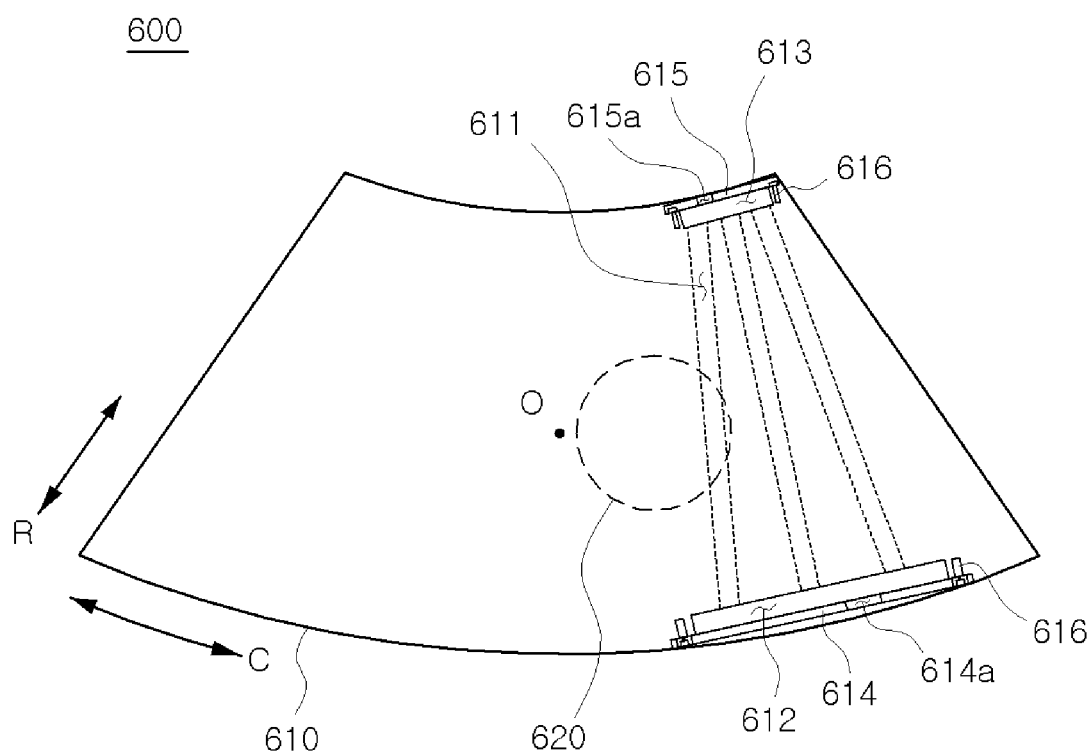
FIG. 10 is a plan view illustrating a first example of a thrust journal bearing according to the exemplary embodiment.
Figure 11:
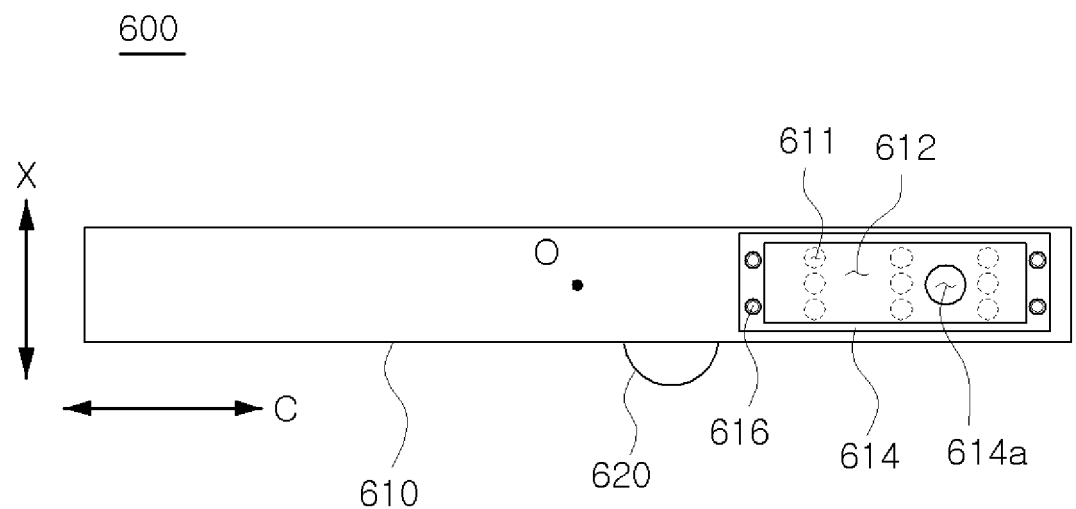
FIG. 11 is a front view of FIG. 10.
Figure 12:
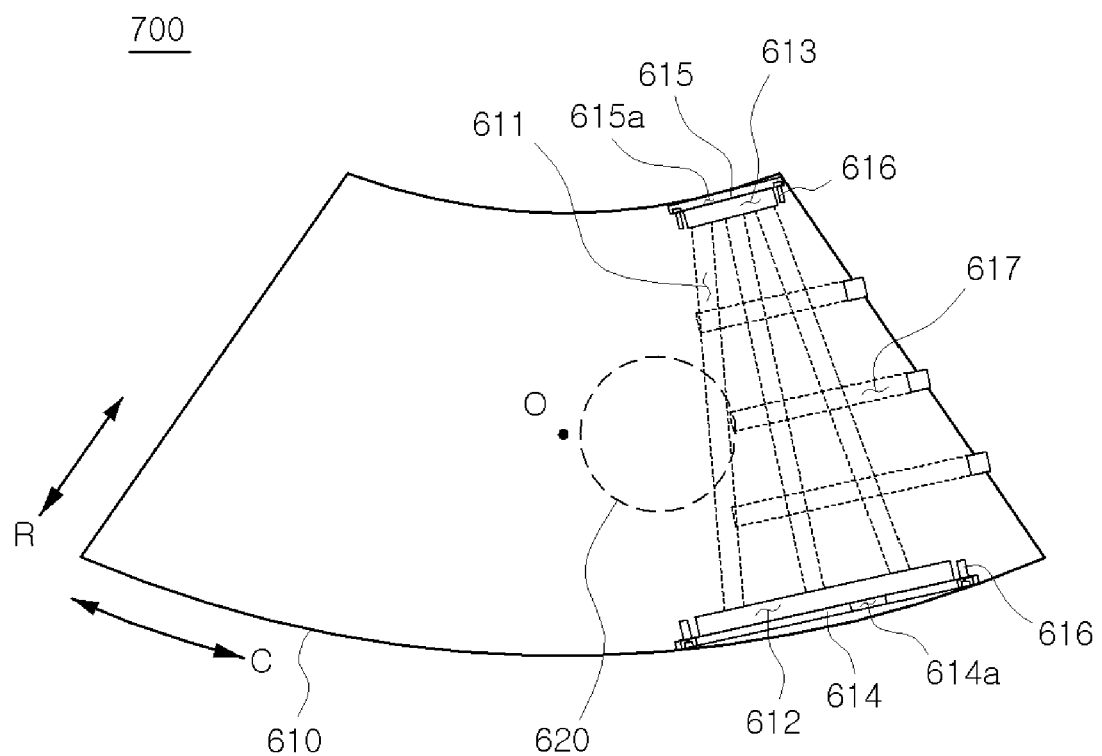
FIG. 12 is a plan view illustrating a second example of a thrust journal bearing according to the exemplary embodiment.
Figure 13:
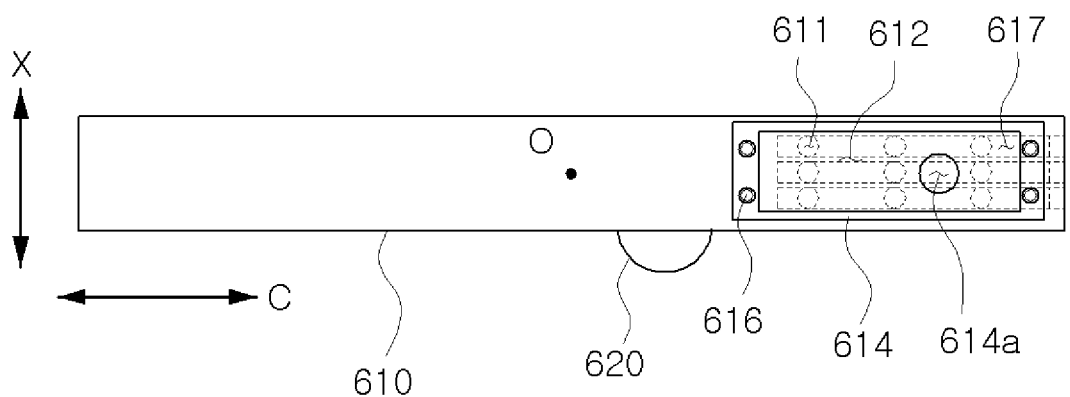
FIG. 13 is a front view of FIG. 12.
Figure 14:
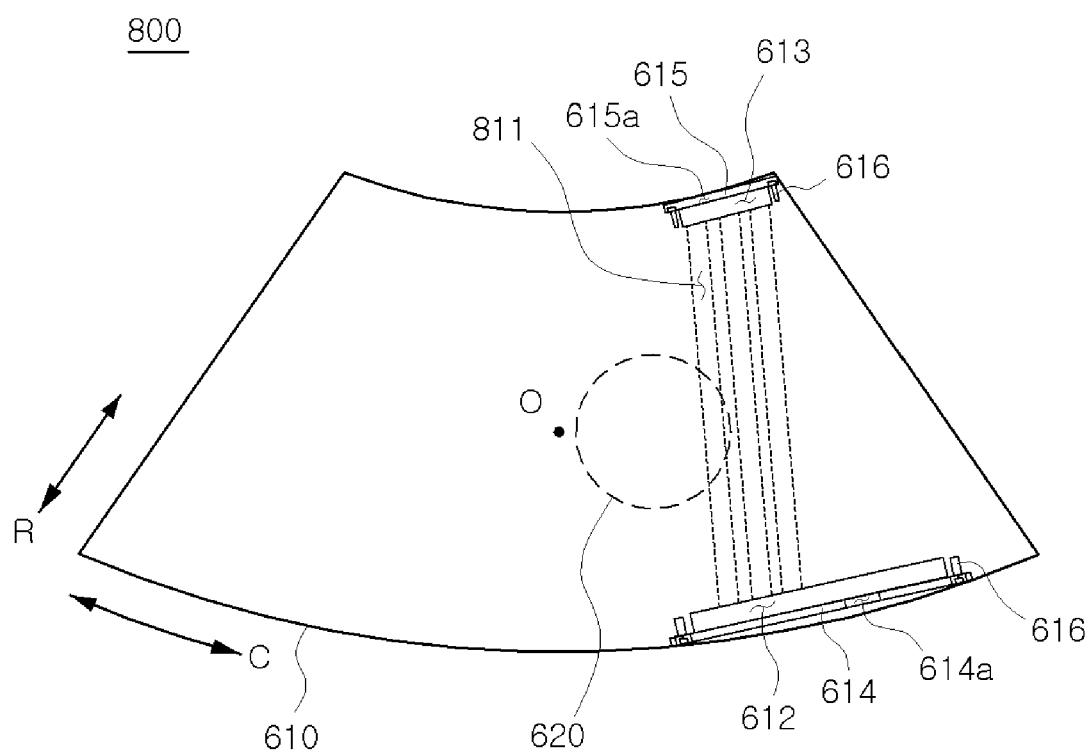
FIG. 14 is a plan view illustrating a third example of a thrust journal bearing according to the exemplary embodiment.
Figure 15:
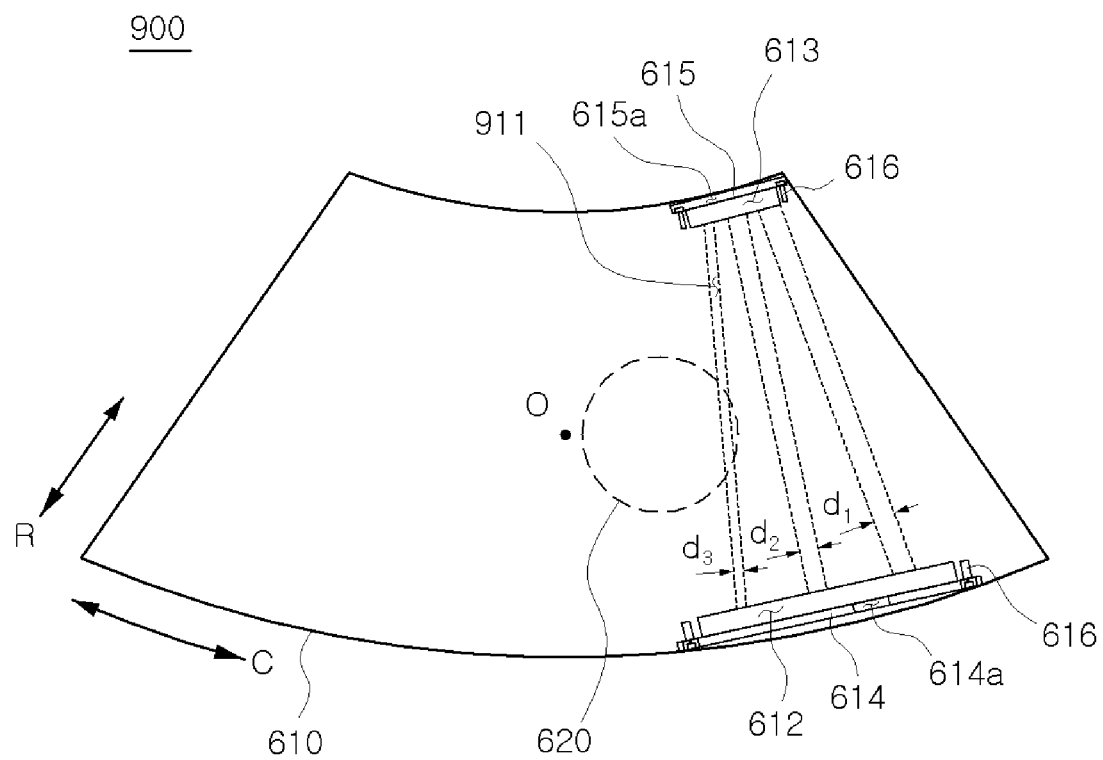
FIG. 15 is a plan view illustrating a fourth example of a thrust journal bearing according to the exemplary embodiment.
Figure 16:
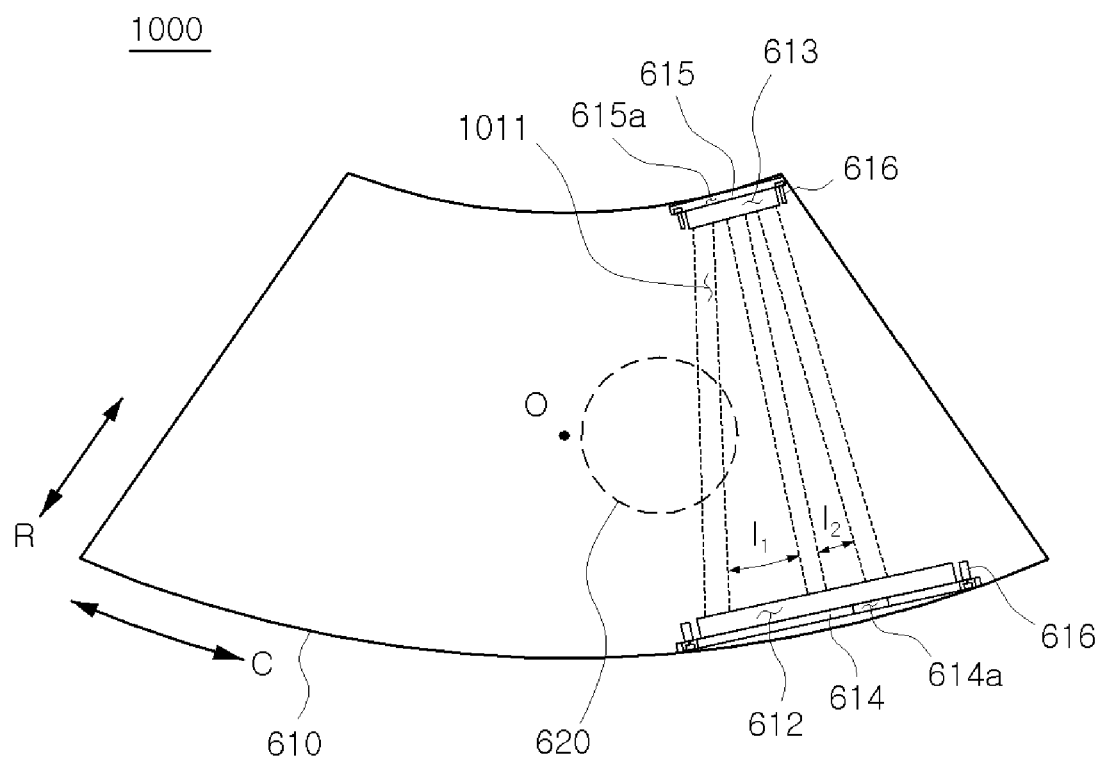
FIG. 16 is a plan view illustrating a fifth example of a thrust journal bearing according to the exemplary embodiment.

FIG. 10 is a plan view illustrating a first example of a thrust journal bearing according to the exemplary embodiment, FIG. 11 is a front view of FIG. 10, FIG. 12 is a plan view illustrating a second example of a thrust journal bearing according to the exemplary embodiment, FIG. 13 is a front view of FIG. 12, FIG. 14 is a plan view illustrating a third example of a thrust journal bearing according to the exemplary embodiment, FIG. 15 is a plan view illustrating a fourth example of a thrust journal bearing according to the exemplary embodiment, and FIG. 16 is a plan view illustrating a fifth example of a thrust journal bearing according to the exemplary embodiment.

Referring to FIGS. 10 and 11, the thrust journal bearing 600 includes a pad 610 and a pivot 620 for supporting the shaft systems 13 and 23 in the axial direction X.

The pad 610 is installed on the thrust collar 15 and 25 provided on the outer side of the shaft system 13 and 23. In addition, the pad 610 may be formed in a plate shape, and may be formed in an arc shape in which a width in the circumferential direction C gradually increases in a direction toward the outside based on the radial direction R of the shaft system 13 and 23 as illustrated in FIG. 10.

The pivot 620 is coupled to an opposite side of the thrust collar 15 and 25 of the pad 610 and is mounted on an external structure to support the pad 610. When viewing the pad 610 in the axial direction X of the shaft system 13 and 23, assuming that the density of the pad 610 is constant for each part, the pivot 620 may be coupled to the pad at a position eccentric from the center of gravity O of the pad 610 along the circumferential direction C of the shaft system 13 and 23.

The pad 610 includes an internal cooling path 611, an inlet chamber 612, and an outlet chamber 613.

When viewing the pad 610 along the axial direction X of the shaft system 13 and 23, the cooling path 611 is spaced apart from the pivot 620 in the axial direction X of the shaft system 13 and 23. The cooling path 111 is composed of a plurality of cooling path sections spaced apart from each other along the circumferential direction C of the shaft system 13 and 23, and the cooling path sections extend along the radial direction R of the shaft system 13 and 23.

To rotatably support the shaft system 13 and 23 while preventing friction between the thrust collar 15 and 25 and the pad 610, oil is supplied between the pad 610 and the thrust collar 15 and 25. Oil provided between the pad 610 and the thrust collar 15 and 25 flows into the cooling path 611. Because the pad 610 is cooled by the oil flowing into the cooling path 611, even when friction occurs between the thrust collar 15 and 25 and the pad 110, it is possible to prevent the temperature of the pad 610 from rising above the threshold value.

The inlet chamber 612 communicates with an inlet of the cooling path 611, and oil provided between the pad 610 and the thrust collar 15 and 25 flows into the inlet chamber. The outlet chamber 613 communicates with an outlet of the cooling path 611, and oil flowing through the cooling path 611 is discharged between the pad 610 and the thrust collar 15 and 25. The inlet chamber 612 and the outlet chamber 613 are disposed spaced apart from each other along the radial direction R of the shaft system 13 and 23, and may be formed at ends of the pad 610, respectively.

The thrust journal bearing 600 may further include an inlet cover 614, an outlet cover 615, and a fastening member 616.

The inlet cover 614 covers the inlet chamber 612, and the outlet cover 615 covers the outlet chamber 613. In this case, the inlet cover 614 has an inlet hole 614a through which oil provided between the thrust collar 15 and 25 and the pad 610 is introduced. The outlet cover 615 has an outlet hole 615a through which the oil flowing through the cooling path 611 is discharged between the thrust collar 15 and 25 and the pad 610. Here, separate circulation means may be coupled to the inlet hole 614a and the outlet hole 615a. Therefore, the oil provided between the thrust collar 15 and 25 and the pad 610 flows by means of the circulation means into the inlet chamber 612 and through the cooling path 611 and is then supplied between the pad 610 and the thrust collar 15 and 25 from the outlet chamber 613 through the circulation means.

The inlet hole 614a or the outlet hole 615a may be formed between the plurality of cooling path sections 611, respectively. For example, the inlet hole 614a or the outlet hole 615a may be disposed in a position offset from one side from the cooling path 611, when viewed along the radial direction R of the shaft system 13 and 23, as shown in FIG. 11. Therefore, the oil flowing into the inlet chamber 612 through the inlet hole 614a may be prevented from flowing into any one of the plurality of cooling path sections 611, and the oil flowing into the outlet chamber 613 through the cooling path 611 may be uniformly discharged through the outlet hole 615a.

On the other hand, the plurality of cooling path sections 611 may be arranged such that the interval therebetween gradually increases in an outward direction with respect to the radial direction R of the shaft system 13 and 23. Therefore, oil flowing into the cooling path 611 through the inlet chamber 612 flows along the radial direction R of the shaft system 13 and 23, and is then discharged to the outside through the outlet chamber 613.

Referring to FIGS. 12 and 13, in the thrust journal bearing 700, the pad 610 further includes an auxiliary flow path 617. The auxiliary flow path 617 is composed of a plurality flow path sections disposed spaced apart from each other along the radial direction R of the shaft system 13 and 23. In addition, the auxiliary flow path sections 617 are formed to intersect with the plurality of cooling path sections 611, respectively. At this time, each auxiliary flow path sections 617 is formed to extend along the circumferential direction C of the shaft system 13 and 23 so that one end thereof faces the pivot 620 and the other end thereof faces the end of the pad 610 based on the circumferential direction C of the shaft system 13 and 23. Therefore, oil flowing through the cooling path sections 611 is supplied to and flows through the auxiliary path sections 617, thereby cooling the pad 610 in a wider range.

Referring to FIG. 14, in the thrust journal bearing 800, a plurality of cooling path sections 811 are arranged at regular intervals in an outward direction with respect to the radial direction R of the shaft system 13 and 23. Further, the cooling path sections 811 are arranged to be inclined with respect to the circumferential direction C of the shaft system 13 and 23. Although FIG. 14 illustrates that the cooling path sections 811 are inclined toward the pivot 620 in an outward direction with respect to the radial direction R of the shaft system 13 and 23, it is understood that this is merely an example, and the cooling path sections 811 may be formed to be inclined in a direction away from the pivot 620 when approaching outward with respect to the radial direction R of the shaft system 13 and 23.

Referring to FIG. 15, in the thrust journal bearing 900, a plurality of cooling path sections 911 may have different diameters. That is, the cooling path sections 911 may be formed to have different diameters (e.g., $d_1 > d_2 > d_3$), respectively.

For example, the plurality of cooling path sections 911 may be formed in a shape whose diameter increases gradually as the distance from the pivot 620 along the circumferential direction C of the shaft system 13 and 23 increases. The temperature of the pad 610 gradually increases from the center toward the end along the circumferential direction C of the shaft system 13 and 23. Therefore, when the diameters of the cooling path sections 911 increase in a direction away from the pivot 620 along the circumferential direction C of the shaft system 13 and 23, the amount of oil flowing in the circumferential direction C from the end of the pad 620 increases than from the central portion of the pad 620, so that the pad 620 can be effectively cooled according to the temperature distribution of the pad 620.

Referring to FIG. 16, in the thrust journal bearing 1000, a plurality of cooling path sections 1011 may be formed at different intervals between adjacent cooling path sections 1011. That is, the cooling path sections 1011 may be formed to have different intervals (e.g., $I_1 > I_2$) based on the circumferential interval at the same position in the radial direction R of the shaft system 13 and 23.

For example, the plurality of cooling path sections 1011 may be arranged such that the interval therebetween gradually decreases as the distance from the pivot 620 increases along the circumferential direction C of the shaft system 13 and 23. The temperature of the pad 610 gradually increases in a direction from the center to the end in the circumferential direction C of the shaft system 13 and 23. Accordingly, when the interval between the cooling path sections 1011 decreases as the distance from the pivot 620 increases along the circumferential direction C of the shaft system 13 and 23, the amount of oil flowing in the circumferential direction C from the end of the pad 620 increases than from the central portion of the pad 620, so that the pad 620 can be effectively cooled according to the temperature distribution of the pad 620.

According to the thrust journal bearing 600, 700, 800, 900, 1000 according to the exemplary embodiments and the power generation system 10 and 20 including the same, the pad can be cooled by circulating oil provided between the pad 610 and the thrust collar 15 and 25 through the cooling path sections 611, 811, 911, 1011, thereby allowing the pad 610 to be continuously cooled during the operation of the power generation system 10 and 20 and preventing the temperature of the pad 610 from rising above the threshold value even if friction occurs between the thrust collar 15 and 25 and the pad 610.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A bearing supporting a shaft system of a power generation system in a radial direction, the bearing comprising a pad disposed on an outer side of the shaft system with respect to the radial direction and including a plurality of cooling paths through which oil flows and a pivot coupled to the outer side of the pad in the radial direction,
   wherein the pad includes an auxiliary flow path intersecting the plurality of cooling paths and through which oil flows, and
   wherein the auxiliary flow path includes a plurality of flow path sections spaced apart from each other along an axial direction of the shaft system.

2. The bearing according to claim 1, wherein the pad is formed in a plate shape curved to surround an outer circumferential surface of the shaft system.

3. The bearing according to claim 1, wherein the plurality of cooling paths is formed on one side of the pivot when viewed along the radial direction of the shaft system.

4. The bearing according to claim 1, wherein the cooling path is formed to extend along the axial direction of the shaft system.

5. The bearing according to claim 1, wherein the cooling path is arranged parallel to the axial direction of the shaft system.

6. The bearing according to claim 1, wherein the auxiliary flow path is formed to extend along a circumferential direction of the pad such that one end thereof faces the pivot and the other end thereof faces the circumferential end of the pad.

7. The bearing according to claim 1, wherein the cooling path is disposed to be inclined with respect to the axial direction of the shaft system.

8. A bearing supporting a shaft system of a power generation system in an axial direction, the bearing comprising a pad disposed on a thrust collar on an outer circumferential surface of the shaft system and including a cooling path through which oil flows,
   wherein the cooling path includes a plurality of cooling path sections disposed such that an interval therebetween is constant in a radially outward direction and the cooling path sections are inclined with respect to a circumferential direction of the shaft system.

9. The bearing according to claim 8, wherein the pad is formed in a plate shape with an arc pattern in which a circumferential width gradually increases in the radially outward direction.

10. The bearing according to claim 8, further comprising a pivot coupled to a side of the pad opposite to the thrust collar.

11. The bearing according to claim 10, wherein the cooling path is formed on one side of the pivot when viewed along the axial direction of the shaft system.

12. The bearing according to claim 8, wherein the cooling path is formed to extend along a the radially outward direction.

13. The bearing according to claim 10, wherein the pad includes an auxiliary flow path intersecting the cooling path and through which oil flows.

14. The bearing according to claim 13, wherein the auxiliary flow path includes a plurality of flow path sections spaced apart from each other along the radially outward direction.

15. The bearing according to claim 4, wherein the auxiliary flow path is formed to extend along a circumferential direction of the pad such that one end thereof faces the pivot and the other end thereof faces the circumferential end of the pad.

* * * * *